Patented Nov. 9, 1943

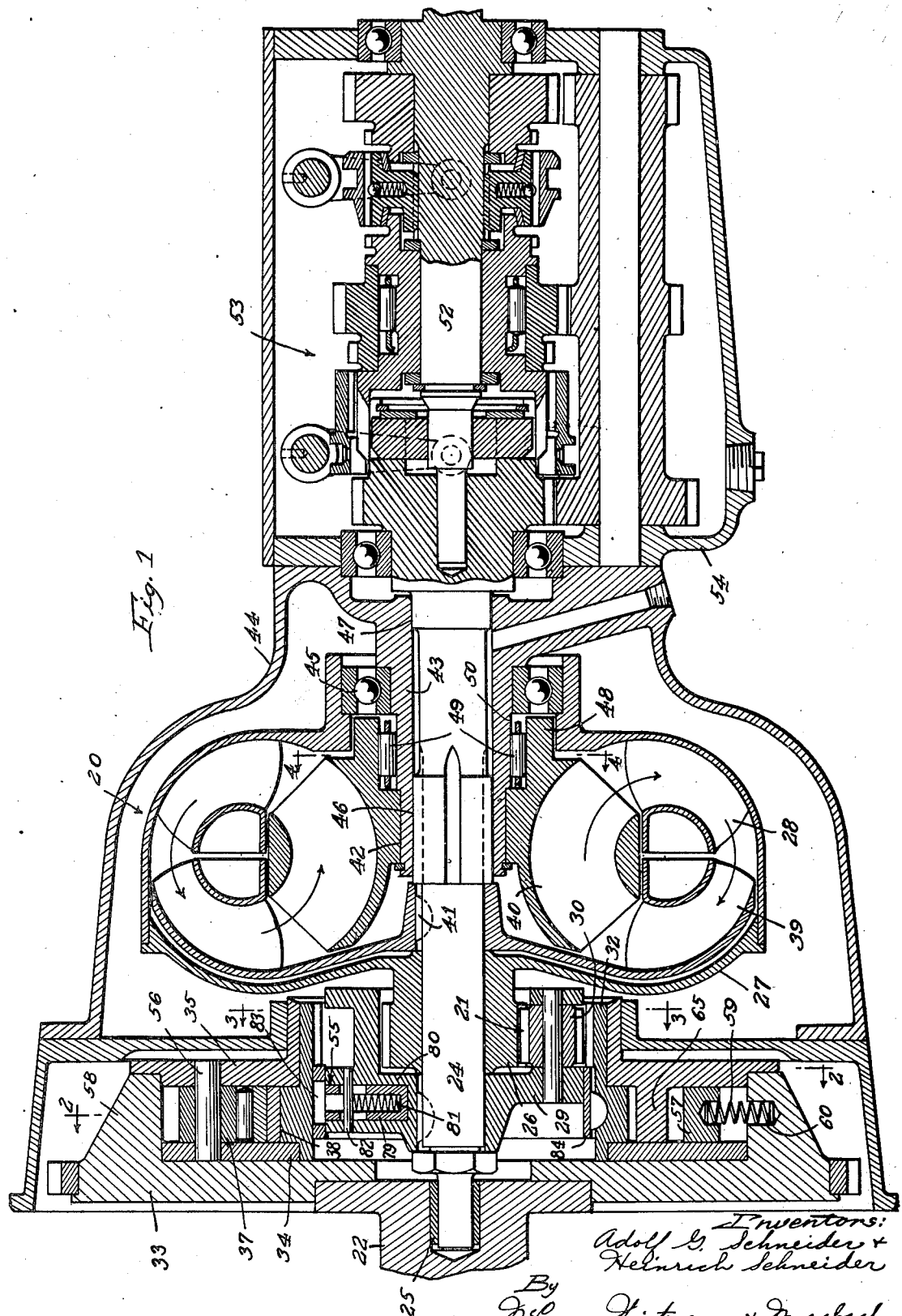

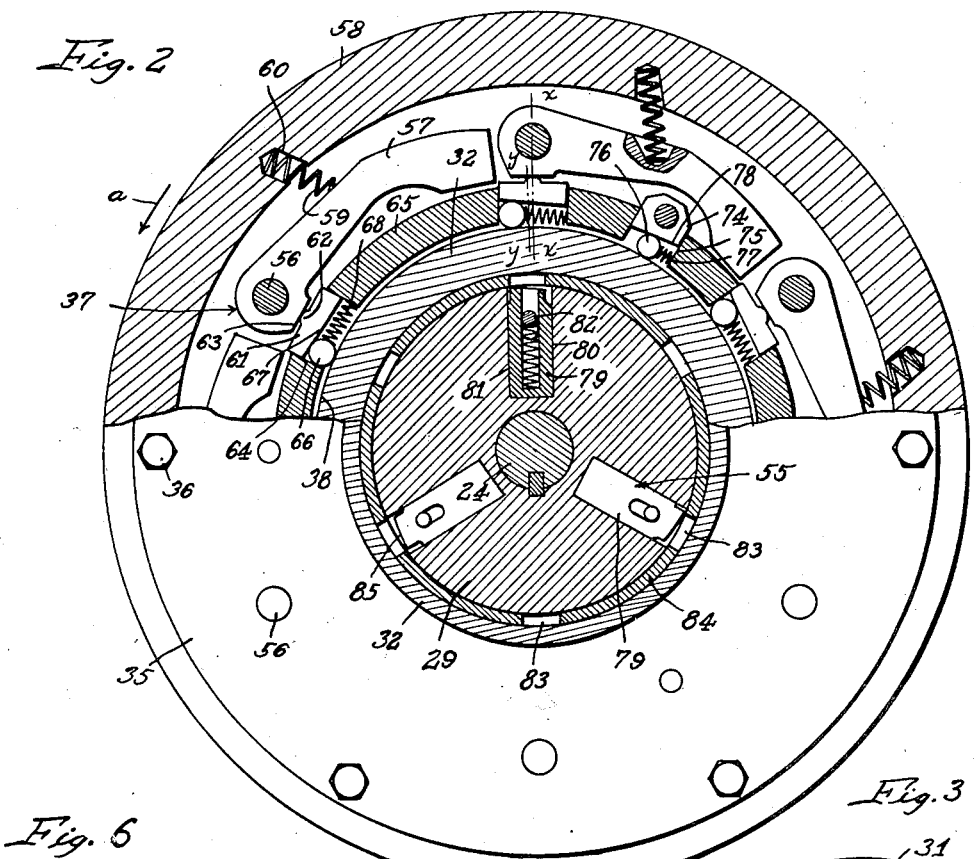
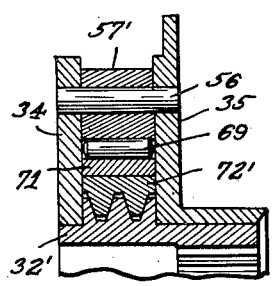
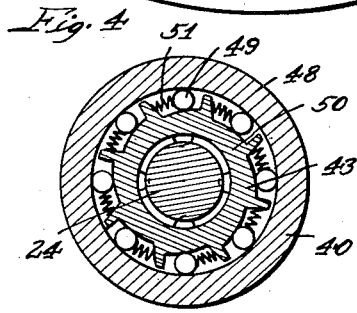
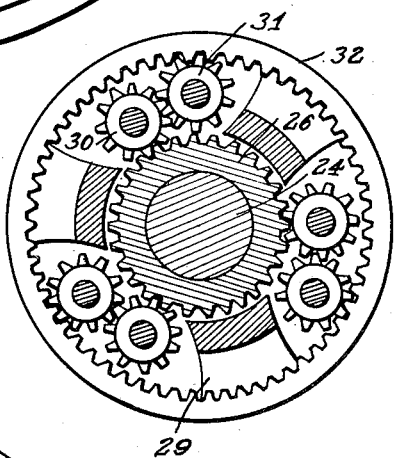
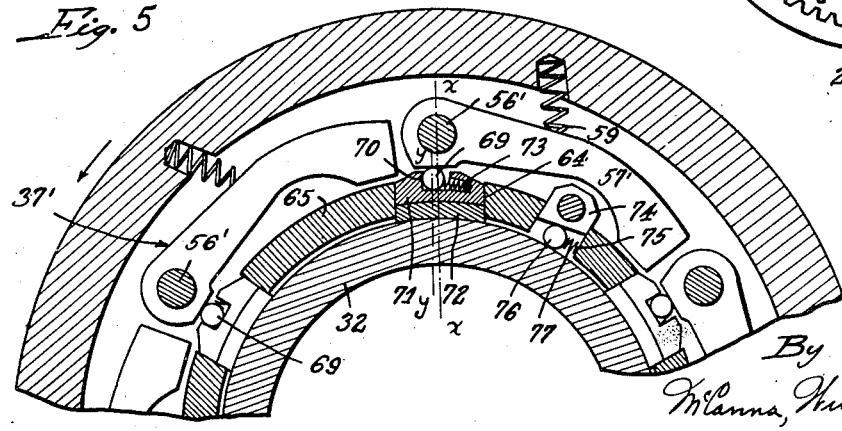

2,333,680

UNITED STATES PATENT OFFICE 2,333,680

TRANSMISSION

Adolf G. Schneider, Muncie, Ind., and Heinrich Schneider, Hamilton, Ohio, assignors, by mesne assignments, to Schneider Brothers Company, a copartnership composed of Heinrich Schneider and Viva Schneider, both of Hamilton, Ohio, and Adolf G. Schneider and Erna Schneider, both of Muncie, Ind.

Application March 19, 1938, Serial No. 196,874

20 Claims. (Cl. 192—3.2)

This invention relates to improvements in transmissions, and is more particularly concerned with automatic centrifugal clutches especially designed and adapted for use with transmissions incorporating Föttinger type torque converters.

One of the main difficulties with hydraulic transmissions is that when the car is standing with the engine idling, there is appreciable hydraulic drag which tends to cause creepage of the car and also interfere with the easy shifting of gears. A friction clutch could be interposed between the engine and hydraulic drive to avoid this difficulty, but it would be a step backward in the art. It is therefore one of the principal objects of our invention to provide an entirely automatic centrifugal clutch for the purpose mentioned, designed to engage the instant a predetermined engine speed is reached, whereby to drive the driving member of the converter which in turn transmits drive to the car, smooth gradual pick-up being assured entirely by fluid slippage in the converter instead of mechanical slippage in the centrifugal clutch.

One of the objects of our invention consists in providing in a single unit of simple, compact, and economical construction automatic centrifugal and freewheeling clutches, the centrifugal clutch means serving to disconnect the engine automatically when idling and the freewheeling clutch means being arranged to overrun during normal drive but engaging when the vehicle is going down hill, so as to use the engine as a brake.

Another object consists in the provision of a centrifugal clutch of simple and practical design in which a weight member is movable outwardly under centrifugal force against the action of a return spring and cooperates with roller means to effect positive engagement of surfaces of relatively small area under high pressure, with minimum slippage.

The invention is illustrated in the accompanying drawings, wherein—

Figure 1 is a longitudinal section through a transmission made in accordance with our invention;

Figs. 2, 3, and 4 are cross-sections on the correspondingly numbered lines of Fig. 1;

Fig. 5 is a fragmentary sectional view corresponding to a portion of Fig. 2, showing a modified or alternative construction of centrifugal clutch, and Fig. 6 is a sectional detail of another centrifugal clutch construction similar to Fig 5.

Similar reference numerals are applied to corresponding parts throughout the views.

Referring first to Fig. 1 we have illustrated our invention as applied to a differential planetary turbine transmission having in combination a Föttinger type torque converter 20 and a planetary gear set 21 for transmitting drive between the crank-shaft 22 of an internal combustion engine, or any other prime mover, and an intermediate drive shaft 24 adapted to transmit drive to the driven shaft 52, as will soon appear. A pilot bearing 25 supports the front end of the drive shaft 24 in line with the crank-shaft 22. 26 is the sun gear turning with the housing 27 and pump impeller 28 of the converter 20. A spider or cage 29 fixed on the end of the shaft 24 supports intermeshed pairs of planetary pinions 30—31 of which the pinions 30 mesh with the sun gear 26 and the pinions 30 mesh with the ring gear 32. The latter is rotatably mounted on the flywheel 33 on plates 34 and 35 suitably secured to the flywheel, as by bolts 36, and, in accordance with our invention, an automatic centrifugal clutch 37 is provided for quickly releasably gripping the ring gear 32 at its periphery 38 to turn with the flywheel. The clutch 37 is more fully described hereinafter and is clearly illustrated in Fig. 2. Now, the torque converter 20 comprises in addition to the housing 27 and pump impeller 28, a turbine wheel 39 and a reaction member 40. The turbine wheel 39 is keyed to the driving shaft 24, as at 41, to transmit drive thereto. The reaction member 40 is normally stationary, but is rotatably supported at 42 on the tubular bearing extension 43 preferably formed integral with the stationary enclosing bell-housing 44. An anti-friction bearing 45 is also carried on the tubular extension 43 for support of one end of the housing 27 of the converter 20, while the inside of said tubular extension constitutes a bearing for the rear end of the drive shaft 24, as indicated at 46 and 47. The reaction member 40 has a hub 48 surrounding freewheeling rollers 49 which cooperate with a cam formation 50 on the periphery of the aforesaid tubular extension 43 and with the usual springs 51 to hold the reaction member 40 against turning in one direction, although allowing free rotation in the opposite direction.

From the description thus far, the operation may be traced at least to this extent: Assuming that the crank-shaft 22 is turning slowly with respect to the stationary shaft 24, as, for example, when the car is standing at a curb with the engine idling, under these circumstances the centrifugal clutch 37, as we shall point out later, is disengaged, thus relieving the engine of the hydraulic drag that would otherwise be imposed thereon. It is well known how this drag caused uneven running at idling speed and a tendency for the car to creep, which sometimes necessitated holding it with the foot brake or emergency brake. It also was objectionable because of its interference with easy shifting of gears where such were provided, as, for example, for forward, neutral and reverse. To get the car under way, the driver simply depresses the accelerator pedal and as the engine speeds up, the centrifugal clutch 37 engages at a predetermined speed so as to transmit drive to the ring gear 32. In that way, drive is transmitted through the planetary gearing 21 to the hydraulic converter 20 and thence to the drive shaft 24, which transmits drive to the driven shaft 52 through drive gearing 53 in a gear box 54 rigid with the housing 44. The sun gear 26 and pump impeller 28, by virtue of the planetary pinions 30—31, are driven in the same direction as the crank-shaft 22 but at a higher speed according to the gear ratio of ring gear 32 to sun gear 26. The planetary gearing 21 may be considered the primary drive and the torque converter 20 the secondary drive. The primary drive exerts a substantially direct torque reaction upon the drive shaft 24 by reason of the thrust imposed upon the planetary gears 30—31 in the turning of the ring gear 32 and the driving of the sun gear 26. There is an additional torque reaction imposed upon the drive shaft 24 by the turbine wheel 39 of the secondary drive, because of the circulation of fluid by the blades of the pump impeller 28 through the blades of the turbine 39 and blades of the reaction member 40 in the counter-clockwise direction indicated by the arrows. The fact that the impeller 28 turns in the same direction with the driving and driven shafts, avoids the necessity for any reversal in the direction of fluid flow by the blades of the reaction member 40, such as would be required if there were single pinions between the sun gear 26 and ring gear 32. By driving the impeller with the sun gear at speeds higher than the prime mover engine speed and in the same direction as the turbine impeller, we are enabled to reduce the size of the turbine drive considerably and still obtain a decided increase in torque and efficiency. The stationary reaction member 40 is, of course, responsible for torque increase. When the impeller 28 turns at a higher speed than the turbine 39, the centrifugal force acting on the oil or other fluid used, causes the same to circulate in the direction indicated by the arrows. When the impeller and turbine rotate at approximately the same speed, the turbine drive functions substantially as a coupling. The free wheeling clutch 48—50 permits the reaction member 40 under these conditions to float so as not to offer resistance to the flow of the fluid. There is, however, very little fluid movement at or close to direct drive. Under direct drive conditions the planetary pinions 30—31 rotate as a unit so that gear noise and wear are substantially eliminated. Under high torque operating conditions, the pump impeller 28 turning with the high speed of the sun gear 26, delivers a large amount of fluid directly upon the turbine blades to exert the desired high torque on the drive shaft 24, and this torque is added to the reaction torque exerted by the planetary pinions 30—31. The turbine torque is at a maximum when the drive shaft 24 is at a standstill. If the speed of the engine is increased, the total torque imposed upon the shaft 24 increases until it overcomes its resistance and the shaft begins to turn. As resistance to turning of the shaft is reduced, its speed increases and the speed of the sun gear 26 is accordingly reduced, assuming that the crankshaft 22 is turning at a constant speed. Under these conditions, the pump impeller 28 reduces its oil delivery and pressure, and hence the torque exerted on the drive shaft 24 by the turbine wheel 39 is reduced. When the resistance to turning of the drive shaft 24 is reduced to a minimum, its speed approaches a maximum and the speed of the sun gear 26 and pump impeller 28 approaches a minimum, and consequently the power transmitted to the drive shaft 24 through the secondary drive becomes a minimum. In other words, with the present transmission the torque and speed of the secondary drive changes automatically in response to the resistance to turning offered by the shaft 24. The secondary drive gives a torque increase varying with the varying torque and speed conditions of the engine and load. The floating sun gear and pump impeller act as an automatic torque and speed control in the transmission, running at high speed when the drive shaft 24 requires high torque. In passing, attention may at this time be called also to the automatic centrifugal clutch 55 provided in connection with the planetary gearing 21 for positively locking the drive shaft 24 with the ring gear 32 for direct drive independent of the planetary gearing. This clutch comprises locking dogs or pawls 79 slidable in radial bores 80 in the spider 29 and normally urged inwardly under the action of springs 81 supported in the bores of the pawls themselves and having abutment with cross-pins 82 carried on the spider and entered through longitudinal slots provided in the pawls. These pawls are movable outwardly against the action of the springs to engage in slots 83 provided in a bushing 84 keyed or otherwise suitably secured in the ring gear 32, the outer ends 85 of the pawls being struck on arcs concentric with respect to the axis of rotation of the bushing 84 so that they can engage in the slots 83 only when the ring gear 32 turns slower than the shaft 24. So long as the bushing 84 turns faster than the shaft 24, in the direction of the arrow a in Fig. 2, the bushing rides on the inclined surfaces 85 and causes the pawls 79 to be forced inwardly, away from locking engagement with the bushing. The clutch 55, in other words, can engage only when the drive shaft 24 attains a certain speed, but is so constructed that it will not engage if the ring gear 32 turns at a higher speed than the shaft 24. This, therefore, permits one to take advantage of the high starting torque obtainable through the turbine drive 20, and then when the car has attained the desired speed, the driver can release foot pressure on the accelerator pedal so that the ring gear 32 will slow down and allow the centrifugal clutch 55 to engage, to establish direct drive. Contrariwise, when the speed of the drive shaft 24 is reduced, the clutch 55, as will later appear, automatically disengages, and, when the car is brought to a stop, the other centrifugal clutch 37 also disengages, the disengagement of clutch 37 occurring when the engine speed drops to a value below the lowest driving speed.

Centrifugal clutch 37 (Fig. 2)

In our earlier application, Serial No. 94,744, now Patent No. 2,224,884, issued December 17, 1940, we disclosed a centrifugal clutch for automatically disconnecting the engine when idling, also a freewheeling clutch adapted to overrun whenever the engine turned faster than the driven shaft, but take hold when said shaft turned faster than the engine, as, for example, when the vehicle is going down hill, so as to permit using the engine as a brake, and also permit starting the engine by pushing or pulling the vehicle. In Fig. 2 we disclose a simple, compact and economical construction, combining in a single unit the centrifugal and freewheeling clutches. The centrifugal clutch, it should be understood, does not serve the purpose of the conventional friction clutch in an automotive transmission, but is of a grab or quick engagement type, provided merely to eliminate drag on the engine in idling and avoid the tendency for the car to move when it should stand still. The usual slip in accelerating the car takes place in the torque converter 20 and not in the clutch 37. The latter is constructed to engage suddenly at a predetermined engine speed to transmit drive to the impeller 28 of the torque converter, and also releases the same way as soon as the engine slows down to idling speed.

The side plates 34 and 35 carry pins 56 on which centrifugal weights 57 are pivoted to swing outwardly under centrifugal force toward the rim 58 of the flywheel against the action of compression springs 59 seating in holes 60, provided therefor in the rim 58. Shoes 61 have cam projections 62 intermediate their ends, slightly offset in a counter-clockwise direction in relation to the pins 56, as indicated by the radial lines x—x and y—y in Fig. 2, for engagement with flat surfaces 63 on the pivoted ends of the weights 57 and are slidable in substantially radial slots 64 in the annular wall 65 on the plate 35. When the weights 57 swing outwardly, the shoes 61 are pushed inwardly and cause free-wheeling rollers 66 to engage and transmit drive to the ring gear 32. The small arrow a in Fig. 2 indicates the direction of rotation, and when the engine is running above idling speed, the ring gear 32 will, of course, be driven because the shoes 61 are moved inward far enough for the inclined inner faces 67 thereof to cooperate with the rollers 66 and thereby transmit drive to the ring gear 32. At idling speed the shoes 61 are clear of the rollers 66 so that the ring gear 32 will remain stationary and free of the engine, the small spring 68 under these conditions keeping the rollers 66 in forward position in disengaged relation to the shoes 61 and ring gear 32.

Fig. 5 shows a modified clutch construction 37' in which the weights 57' are similar to the weights 57 and are pivoted in a similar way, but each weight has, directly under but likewise in slightly offset relation to its pivoted end, as indicated by the radial lines x—x and y—y, a roller 69 similar to a freewheeling roller, set in a slot 70 in a shoe 71 which in turn is arranged to force a friction shoe 72 against the ring gear 32. The springs 73 hold the rollers 69 slightly offset in a counter-clockwise direction in relation to the pivots 56' so as not to transmit drive when the engine is turning at idling speed. However, when the weights 57' swing outwardly in speeding up of the engine, the rollers 69 are moved in a clockwise direction against the action of the springs 73, and the shoes 72 are pressed with considerable force against the ring gear 32 to transmit drive thereto. The springs 73 allow a slight movement of the rollers 69 from a retracted position at one end of the slots 70 to an operative position at the other end of the slots. In the constructions of Figs. 2 and 5, the cam projections 62 and the rollers 69 cooperating with the flat surfaces 63 on the centrifugal weights 57 and 57', respectively, are offset so slightly with relation to the pivots 56 and 56', respectively, that the centrifugal weights have proportionately greater leverage and the pressure of engagement is proportionately greatly increased. To increase the power capacity of the clutch, the shoes for transmitting drive to the ring may be of V-section, as at 72' in Fig. 6, and engage in V-grooves in the periphery of the ring gear 32'. The engagement of the clutches is so quick and under such high pressure that there is no appreciable wear on the friction shoes, as we have found by extensive tests.

In both of the constructions disclosed (Figs. 2 and 5) three freewheeling cams 74 are mounted in slots 75 to cooperate with rollers 76 and springs 77 to transmit drive from the ring gear 32 to the flywheel of the engine whenever the shaft 24 turns faster than the engine. It will be noticed that the inside faces 78 of the cams 74 are inclined in the opposite direction from the faces 67 of the shoes 61 (Fig. 2).

It should be clear that either of the centrifugal clutch constructions just described may be used with various transmissions, the same having characteristics which adapt them to use with particular advantage in connection with torque converters or hydraulic clutches. It is well known that one of the main difficulties with automatic hydraulic transmissions is that when the vehicle is standing with the engine idling there is invariably enough hydraulic drag to tend to cause "creeping" and to interfere with the easy shifting of gears that may be provided as a part of the transmissions. With the present centrifugal clutch constructions, one of these clutches interposed between the engine and the torque converter or hydraulic clutch is arranged to come into engagement only when the idling speed is exceeded so that there is absolutely no power transmitted from the engine during idling. The centrifugal weights of the clutch function the instant a predetermined speed above idling speed is attained and it is only then that the primary side of the torque converter or hydraulic clutch turns with the engine. Obviously the wear and tear on the clutch surfaces is determined by the amount of energy lost in this synchronization, and since there is nothing but the primary side of the torque converter 20 and the ring gear 32 to bring up to engine speed, the energy, which is proportional to the amount of rotating mass, will be small, and the wear and tear on the clutch surfaces will be correspondingly slight. In other words, it is only because it is used in combination with the hydraulic torque converter that such a quick engagement or grab type clutch can be used having much less friction surface than would be required if it had to absorb the slippage which the torque converter is designed to absorb. The fact that the torque converter absorbs the slippage, not only makes it feasible to provide a quick engagement or grab type centrifugal clutch 37 or 37' in front of the torque converter 20, but also enables the use of quick engagement type clutches in two and three step gear boxes behind the torque converter.

It should also be clear that while we have shown the centrifugal clutch interposed on the primary side of the torque converter 20, clutches of this type may be incorporated elsewhere in other transmissions, still taking advantage of the novel characteristics mentioned above.

It is believed the foregoing description conveys a good understanding of our invention. The appended claims have been drawn with a view to covering all legitimate modifications and adaptations.

We claim:

1. In a friction clutch, the combination of relatively rotatable driving and driven elements, lever members pivoted on the driving element to swing outwardly under centrifugal force, spring means tending to move said lever members inwardly to retracted position, freewheeling rollers disposed in circumferentially spaced slots provided in the driving element engaging the periphery of the driven element and normally spring pressed in one direction to declutched position, and cam blocks movable in said slots having surfaces inclined with respect to the periphery of the driven element, said cam surfaces engaging the rollers and retaining the same in operative relationship to the driven element, said blocks being normally in one position permitting turning of the driving element relative to the driven element, but being adapted to be moved inwardly toward the driven element by the pivoted ends of said levers so as to cause a binding action of the rollers between the cam blocks and the periphery of the driven element when the levers swing outwardly under centrifugal force, whereby to transmit drive to the driven element.

2. In a friction clutch, the combination of relatively rotatable driving and driven elements, lever members pivoted on the driving element to swing outwardly under centrifugal force, spring means tending to move said lever members inwardly to retracted position, friction shoe means disposed in slots provided in the driving element in circumferentially spaced relation relative to the periphery of the driven element, said friction shoe means being engageable with the periphery of said driven element to transmit drive thereto, and rollers mounted in said friction shoe means under the pivoted portions of the aforesaid levers and spring pressed normally to a retracted position spaced circumferentially with respect to radial lines from the axis of rotation of the clutch through the pivots of said levers but adapted to be moved against the counteracting spring pressure toward said radial lines when the levers swing outwardly under centrifugal force, whereby to force the friction shoe means into tight driving engagement with the periphery of the driven element.

3. A clutch as set forth in claim 2, including a freewheeling roller disposed in each of one or more slots provided in the driving element, and a cam block having a cam surface inclined relative to the periphery of the driven element and adapted to cause binding action of each of the rollers between the blocks and the periphery of the driven element when the driven element commences to turn faster than the driving element, said rollers being normally spring pressed toward clutched position.

4. A clutch as set forth in claim 2, wherein the inter-engaging surfaces on the periphery of the driven element and the friction shoe means are conformed with respect to one another to provide interfitting V-shaped projections and grooves annularly with respect to the periphery of the driven element.

5. In a friction clutch, the combination of relatively rotatable driving and driven elements, lever members pivoted on the driving element to swing outwardly under centrifugal force, spring means tending to move said lever members inwardly to retracted position, friction shoes disposed in slots provided in the driving element in circumferentially spaced relation relative to the periphery of the driven element, said shoes being engageable with the periphery of said driven element to transmit drive thereto, pressure blocks disposed in the slots with the shoes and adapted to exert pressure on the latter toward frictional engagement thereof with the periphery of the driven element, and rollers mounted in the pressure blocks under the pivoted ends of the aforesaid levers and spring pressed normally to a retracted position spaced circumferentially with respect to radial lines from the axis of rotation of the clutch through the pivots of said levers but adapted to be moved against the counteracting spring pressure toward said radial lines when the levers swing outwardly under centrifugal force, whereby to force the shoes into tight driving engagement with the periphery of the driven element.

6. A clutch as set forth in claim 5, wherein the inter-engaging surfaces on the periphery of the driven element and the friction shoes are conformed with respect to one another to provide interfitting V-shaped projections and grooves annularly with respect to the periphery of the driven element.

7. A centrifugal clutch comprising, in combination, relatively rotatable driving and driven elements, one or more centrifugal weight members pivotally mounted on the driving element to swing outwardly under centrifugal force, spring means normally tending to move said weight members inwardly to retracted position, a freewheeling roller associated with each of said centrifugal weight members and moving with the driving element and engaging the periphery of the driven element, spring means normally urging said rollers in one direction to declutched position, and a pressure block associated with each of said rollers, moving with the driving element and engaging the rollers to retain the same in operative relationship to the driven element, the pivoted portion of each of said weight members and the associated pressure block having abutting surfaces, the abutment being on a line in slightly spaced relation to a radius from the axis of revolution of the driving and driven elements through the pivot point of the weight member.

8. A centrifugal clutch comprising, in combination, relatively rotatable driving and driven elements, one or more centrifugal weight members pivotally mounted on the driving element to swing outwardly under centrifugal force, spring means normally tending to move said weight members inwardly to retracted position, one or more friction shoes moving with the driving element and engaging the driven element to transmit drive thereto, and a roller cooperating with each of said shoes and the related weight member to hold the shoe in operative relation to the driven element, each of said rollers being normally spring pressed in one direction toward retracted position and the pivoted portion of each of said levers having a flat surface provided on the inner side thereof for engagement with the associated roller, the rollers being normally disposed in slightly spaced relation to radial lines from the axis of rotation of the driving and driven elements through the pivot points of said weight members.

9. A clutch as set forth in claim 8, wherein the inter-engaging surfaces on the periphery of the driven element and the friction shoes are conformed with respect to one another to provide interfitting V-shaped projections and grooves annularly with respect to the periphery of the driven element.

10. For use with relatively rotatable driving and driven elements, and a hydraulic turbo ring drive for transmitting drive from the driving element to the driven element adapted to absorb substantially all of the slippage between said elements during driving, a centrifugal friction clutch for completing the driving connection in series with the turbo ring drive substantially without slippage, comprising one or more centrifugal weight members pivotally mounted on the driving element in radially spaced relation to the axis of rotation thereof to swing outwardly under centrifugal force, each having a working surface substantially normal to a radius from the axis of rotation through the pivot point, which surface is inclined at an acute angle to the radius when the weight member swings outwardly under centrifugal force, spring means normally tending to move said weight members inwardly to retracted position, and clutch means operatively engaging the working surface of each weight member to provide with said weight members a quick gripping clutch to connect the driving and driven elements substantially without slippage.

11. A centrifugal clutch comprising, in combination, relatively rotatable driving and driven elements, one or more centrifugal weight members pivotally mounted on the driving element in radially spaced relation to the axis of rotation thereof to swing outwardly under centrifugal force, each having a working surface substantially normal to a radius from the axis of rotation through the pivot point, which surface is inclined at an acute angle to the radius when the weight member swings outwardly under centrifugal force, spring means normally tending to move said weight members inwardly to retracted position, and a roller cooperating with the working surface of each weight member to form a quick gripping clutch to connect the driving and driven elements.

12. A centrifugal clutch comprising, in combination, relatively rotatable driving and driven elements, one or more centrifugal weight members pivotally mounted on the driving element in radially spaced relation to the axis of rotation thereof to swing outwardly under centrifugal force, each having a working surface substantially normal to a radius from the axis of rotation through the pivot point, which surface is inclined at an acute angle to the radius when the weight member swings outwardly under centrifugal force, spring means normally tending to move said weight members inwardly to retracted position, a shoe member and a roller member associated with each of said weight members and moving with the driving element relative to the periphery of the driven element, one of said shoe and roller members being arranged to be engaged by the working surface of the weight member when the latter swings outwardly under centrifugal force to produce a quick gripping clutch action between the driving and driven elements.

13. A centrifugal clutch comprising, in combination, relatively rotatable driving and driven elements, one or more centrifugal weight members pivotally mounted on the driving element in radially spaced relation to the axis of rotation thereof to swing outwardly under centrifugal force, each having a working surface substantially normal to a radius from the axis of rotation through the pivot point, which surface is inclined at an acute angle to the radius when the weight member swings outwardly under centrifugal force, spring means normally tending to move said weight members inwardly to retracted position, a shoe member and a roller member associated with each of said weight members and moving with the driving element relative to the periphery of the driven element, one of said shoe and roller members being arranged to be engaged by the working surface of the weight member when the latter swings outwardly under centrifugal force to produce a quick gripping clutch action between the driving and driven elements, and spring means normally urging said rollers in one direction to retracted position.

14. A centrifugal clutch comprising, in combination, relatively rotatable driving and driven elements, one or more centrifugal weight members pivotally mounted on the driving element in radially spaced relation to the axis of rotation thereof to swing outwardly under centrifugal force, each having a working surface substantially normal to a radius from the axis of rotation through the pivot point, which surface is inclined at an acute angle to the radius when the weight member swings outwardly under centrifugal force, spring means normally tending to move said weight members inwardly to retracted position, a shoe member and a roller member associated with each of said weight members and moving with the driving element relative to the periphery of the driven element, one of said shoe and roller members being arranged to be engaged by the working surface of the weight member when the latter swings outwardly under centrifugal force to produce a quick gripping clutch action between the driving and driven elements, one or more other rollers and cooperating cam blocks moving with the driving element relative to the periphery of the driven element, said cam blocks having cam surfaces for engagement with said rollers so inclined with respect to the periphery of the driven element that the rollers cause a binding action between the cam blocks and the periphery of the driven element only when the driven element turns faster than the driving element, said rollers being spring pressed normally toward clutched position.

15. A clutch as set forth in claim 1, including a freewheeling roller disposed in each of one or more slots provided in the driving element, and a cam block having a cam surface inclined relative to the periphery of the driven element and adapted to cause binding action of each of the rollers between the blocks and the periphery of the driven element when the driven element commences to turn faster than the driving element, said rollers being normally spring pressed toward clutched position.

16. A friction clutch as set forth in claim 5, including a freewheeling roller disposed in each of one or more slots provided in the driving element, and a cam block having a cam surface inclined relative to the periphery of the driven element and adapted to cause binding action of each of the rollers between the blocks and the periphery of the driven element when the driven element commences to turn faster than the driving element, said rollers being normally spring pressed toward clutched position.

17. In a friction clutch, the combination of relatively rotatable driving and driven elements, lever members pivoted on the driving element to swing outwardly under centrifugal force, spring means tending to move said lever members inwardly to retracted position, friction shoes disposed in slots provided in the driving element in circumferentially spaced relation relative to the periphery of the driven element, said shoes being engageable with the periphery of said driven element to transmit drive thereto, pressure blocks disposed in the slots with the shoes and adapted to exert pressure on the latter toward frictional engagement thereof with the periphery of the driven element, means projecting from the pressure blocks under the pivoted ends of the aforesaid levers for actuation of the pressure blocks when the levers swing outwardly under centrifugal force, whereby to force the shoes into tight driving engagement with the periphery of the driven element, and a freewheeling roller disposed in each of one or more slots provided in the driving element, and a cam block having a cam surface inclined relative to the periphery of the driven element and adapted to cause binding action of each of the rollers between the blocks and the periphery of the driven element when the driven element commences to turn faster than the driving element, said rollers being normally spring pressed toward clutched position.

18. In a friction clutch, the combination of relatively rotatable driving and driven elements, lever members pivoted on the driving element to swing outwardly under centrifugal force, spring means tending to move said lever members inwardly to retracted position, friction shoes disposed in slots provided in the driving element in circumferentially spaced relation relative to the periphery of the driven element, said shoes being engageable with the periphery of said driven element to transmit drive thereto, pressure blocks disposed in the slots with the shoes and adapted to exert pressure on the latter toward frictional engagement thereof with the periphery of the driven element, and rollers mounted on the pressure blocks under the pivoted ends of the aforesaid levers for actuation of said pressure blocks when the levers swing outwardly under centrifugal force, whereby to force the shoes into tight driving engagement with the periphery of the driven element.

19. A clutch as set forth in claim 18, wherein the inter-engaging surfaces on the periphery of the driven element and the friction shoes are conformed with respect to one another to provide interfitting V-shaped projections and grooves annularly with respect to the periphery of the driven element.

20. A centrifugal clutch comprising, in combination, relatively rotatable driving and driven elements, one or more centrifugal weight members pivotally mounted on the driving element in radially spaced relation to the axis of rotation thereof to swing outwardly under centrifugal force, each having a working surface substantially normal to a radius from the axis of rotation through the pivot point, which surface is inclined at an acute angle to the radius when the weight member swings outwardly under centrifugal force, spring means normally tending to move said weight members inwardly to retracted position, clutch means turning with the driving element and associated with each of said centrifugal weight members to transmit drive to the driven element, and a roller between each of said clutch means and the working surface of the associated centrifugal weight member to provide a quick gripping clutch action when the centrifugal weight member moves outwardly under centrifugal force.

ADOLF G. SCHNEIDER.
HEINRICH SCHNEIDER.